United States Patent Office 3,076,812
Patented Feb. 5, 1963

3,076,812
CERTAIN BENZOXAZOLE-2-ACRYLIC ACIDS
Franz Ackermann, Binningen, Max Duennenberger, Birsfelden, and Adolf Emil Siegrist, Basel, Switzerland, assignors to Ciba Limited, Basel, Switzerland
No Drawing. Filed July 15, 1957, Ser. No. 671,727
Claims priority, application Switzerland July 31, 1956
3 Claims. (Cl. 260—307)

This invention provides a process for the manufacture of $\alpha$:$\beta$-di-(arylazolyl)-ethylene derivatives of the formula (1)
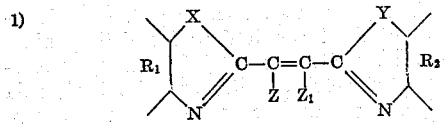

in which $R_1$ and $R_2$ each represents an aryl residue fused on to the azole ring in the manner indicated, each of X and Y represents oxygen, sulfur or an —$NR_3$— group (in which $R_3$ represents hydrogen or a lower alkyl group) and X and Y may be identical with or different from each other, and each of Z and $Z_1$ represents hydrogen or a halogen atom or a lower alkyl group and may be identical with or different from each other, wherein an aminoaryl-compound of the formula (2)

in which $R_1$ represents an aryl residue bound to the —XH and —$NH_2$ groups in the manner indicated, and X has the meaning given above, is condensed with an unsaturated dicarboxylic anhydride of the formula (3)
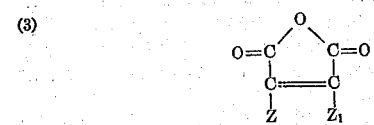

in which Z and $Z_1$ have the meanings given above, and the monocarboxylic acid so obtained with splitting up of the anhydride ring is further condensed by means of an agent capable of eliminating water with an aminoaryl-compound of the formula (4)

in which $R_2$ represents an aryl residue bound to the —YH and —$NH_2$ groups in the manner indicated, and Y has the meaning given above.

The aminoaryl-compounds of the Formula 2 to be condensed with the unsaturated dicarboxylic anhydrides and the aminoaryl-compounds of the Formula 4 may be identical or different and may contain in a position vicinal to the primary amino group bound to an aryl-carbon atom a mercapto group, an at most secondary amino group or advantageously a hydroxyl group. There may be used, for example, naphthalenes which contain the amino group and the group —XH or —YH in the 1:2-position or 2:1-position. It is of advantage to use aminoaryl compounds of the benzene series, for example, those which contain a single benzene nucleus, which may contain, in addition to the amino group and the group —XH or —YH, further substituents, for example, lower alkyl or alkoxy groups, such as methyl, ethyl, methoxy or ethoxy groups, halogen atoms such as chlorine, or nitro groups. As examples of such aminoaryl compounds there may be mentioned:

1-amino-2-hydroxy-naphthalene
1-amino-2-hydroxy-benzene
1-amino-2-hydroxy-5-methyl-benzene
1-amino-2-hydroxy-4-methyl-benzene
1-amino-2-hydroxy-5-methyl-benzene
1-amino-2-hydroxy-3:5-dimethyl-benzene
1-amino-2-hydroxy-5-tert.butyl-benzene
1-amino-2-hydroxy-4-nitrobenzene
1-amino-2-hydroxy-5-nitrobenzene
1-amino-2-hydroxy-4-chlorobenzene
1-amino-2-hydroxy-5-chlorobenzene
1-amino-2-hydroxy-3:5-dichlorobenzene
1:2-diamino-benzene
1:2-diamino-naphthalene
Isopropyl-ortho-phenylene diamine
1-methoxy-3:4-diaminobenzene
1-amino-2-monomethylaminobenzene
1-methyl-3:4-diaminobenzene
1-chloro-3:4-diaminobenzene
2-amino-thiophenol
5-nitro-2-amino-thiophenol As unsaturated dicarboxylic anhydrides of the above Formula 3 there may be mentioned, for example, the following:

Monomethyl-maleic anhydride (citraconic anhydride)
Dimethyl-maleic anhydride
Monoethyl-maleic anhydride
Isopropyl-maleic anhydride
Monochloro-maleic anhydride
Dichloro-maleic anhydride
Monobromo-maleic anhydride
Methyl-chloro-maleic anhydride Advantageously maleic anhydride is used as the unsaturated dicarboxylic anhydride on account of the ease with which it can be obtained and its reactivity.

Depending on the reaction conditions under which the aminoaryl-compound of the Formula 2 is condensed with the unsaturated dicarboxylic anhydride of the Formula 3, there are obtained intermediate products which correspond to the formula (5)
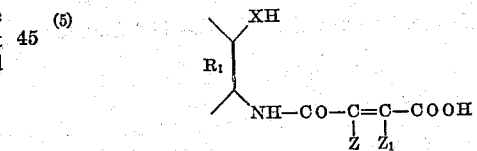

or intermediate products of the formula (6)
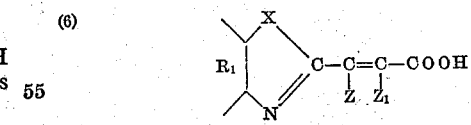

in which $R_1$, X, Z and $Z_1$ have the meanings given above, which intermediate products may be isolated from the reaction mixture by methods in themselves known.

The compounds of the Formula 5 can be obtained by the additive combination of 1 molecular proportion of an aminoaryl-compound of the Formula 2 with 1 molecular proportion of an unsaturated dicarboxylic anhydride of the Formula 3:

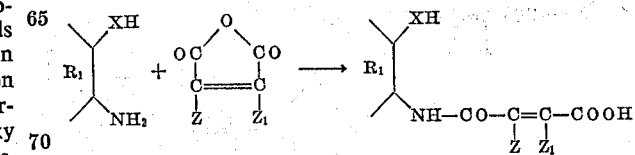

This reaction is advantageously carried out in the presence of an inert organic solvent, such as benzene, chlorobenzene, toluene or xylene, at a moderately raised temperature, for example, within the range of 40° C. to 90° C.

The intermediate products of the Formula 6 are obtained by condensing one molecular proportion of an aminoaryl-compound of the Formula 2 with one molecular proportion of an unsaturated dicarboxylic anhydride of the Formula 3 in the presence of an acid catalyst, such as para-toluene sulfonic acid or boric acid, and advantageously in the presence of a high boiling inert organic solvent, for example, dichlorobenzene or cymene, at a temperature above 150° C. but below 200° C., and advantageously within the range of 150° C. and 180° C., one molecular proportion of water being split off as follows:

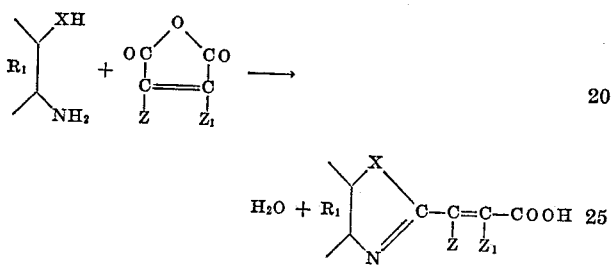

It has been found that the arylazole compounds of the Formula 6 can also be obtained by treating an arylamino-compound of the Formula 5 with an agent capable of eliminating water, for example, zinc chloride, as follows:

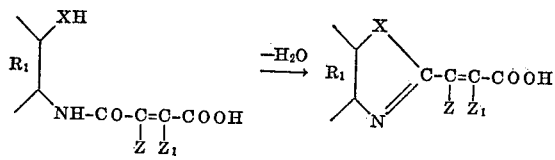

By treating the arylamino-compound of the Formula 5 in a zinc chloride melt, to which it is of advantage to add a small amount of water before the melt is heated up, the elimination of water and consequent ring closure to form the monoazole compound can be carried out in a simple manner and with good results. Suitable temperatures for bringing about the elimination of water with zinc chloride are, for example, 140° C.–180° C., and advantageously about 170° C.

In the process of the invention the monocarboxylic acids of the Formulae 5 and 6 obtained as intermediate products are further condensed by means of an agent capable of eliminating water with an aminoaryl-compound of the formula (4)

in which $R_2$ and $Y$ have the meanings given above. The reactions may be represented by the following equations

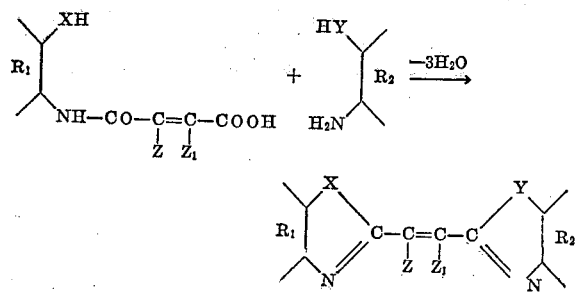

and

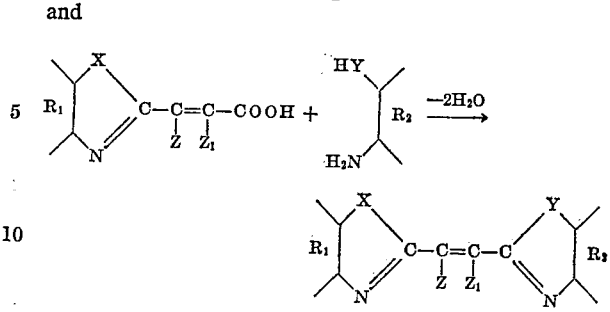

As agent capable of eliminating water there is especially suitable for this further condensation boric acid. Advantageously, the reaction components, namely the intermediate product of the Formula 5 or 6 and the aminoaryl compound of the Formula 4, are heated in the presence of an inert gas, such as nitrogen, with boric acid and, if desired, under reduced pressure at a temperature within the range of 120–200° C. It is also possible to work in the presence of a high boiling inert organic solvent, for example, cymene, at atmospheric pressure and without an inert gas.

The $\alpha:\beta$-di-(arylazolyl)-ethylene derivatives of the above Formula 1 are in part known. In general they fluoresce in ultra-violet light and can therefore be used for producing optical effects. Very valuable as optical brightening agents are, for example, compounds of the formula

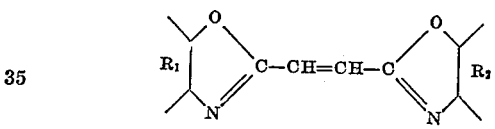

in which $R_1$ and $R_2$ each represents a benzene radical fused to the heterocyclic ring in the manner indicated, and at least one of these benzene radicals containing as a substituent a lower alkyl group, for example, an ethyl group or especially a methyl group. The alkyl group may be present, for example, in the 4- or 5-position of the benzoxazole radical.

Good results are obtained, for example, in optically brightening lacquers, films and especially synthetic fibers, for example, those of cellulose esters, polyacrylonitrile ("Orlon"), polyesters ("Terylene," "Dacron") or polyvinyl chloride ("Thermovyl," "Dynel"). The treatment of the material to be optically brightened may be carried out in the usual manner. Textile fibers are advantageously brightened in an aqueous medium in which the compound is suspended, advantageously in a finely dispersed form.

New products are the monocarboxylic acids of the Formulae 5 and 6, which are used as intermediate products in the process of this invention. The invention also includes these new compounds as valuable intermediate products for the manufacture of products which are suitable for application to textiles, especially optical brightening agents or dyestuffs.

The following examples illustrate the invention, the parts and percentages being by weight unless otherwise stated and the relationship of parts by weight to parts by volume being the same as that of the kilogram to the liter:

*Example 1*

49 parts of maleic anhydride are added in the course of about 15 minutes at 70–75° C. to 55 parts of 1-amino-2-hydroxybenzene in 600 parts of chlorobenzene. The whole is then stirred for a few hours longer at 70–75° C. The whole is then allowed to cool, and the precipitated condensation product is filtered off, washed with chlorobenzene and ethyl alcohol, and dried. In this manner there is obtained the product of the formula

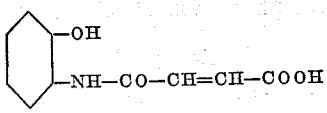

in the form of a bright powder which melts at 173° C. 20.7 parts of this condensation product are melted with 14.4 parts of 1-amino-2-hydroxy-5-chlorobenzene and 0.4 part of boric acid for 5 hours under the reduced pressure of a water jet pump, during which nitrogen is continuously introduced into the reaction vessel. The melt is then extracted at the boil with 100 parts of methyl alcohol, then cooled, filtered, and the filter residue is recrystallized from a mixture of methylene chloride and methyl alcohol. The condensation product of the formula

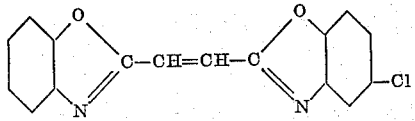

is obtained in the form of yellow needles melting at 200–202° C., which are soluble in dioxane, ethyl alcohol and methylene chloride.

By using, instead of 14.4 parts of 1-amino-2-hydroxy-5-chlorobenzene, an equivalent quantity of 1-amino-2-naphthol, there is obtained the compound of the formula

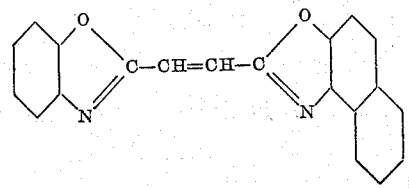

having similar properties.

Example 2

49 parts of maleic anhydride are added in the course of 15 minutes at 70–75° C. to 62 parts of 1-amino-2-hydroxy-5-methyl benzene in 600 parts of chlorobenzene. The whole is then stirred for a few hours longer at 70–75° C. The whole is then allowed to cool, and the precipitated condensation product is filtered off, washed with chlorobenzene and benzene, and dried. The compound of the formula

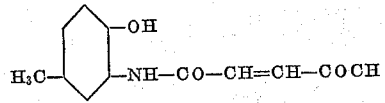

is obtained in the form of a yellow crystalline powder melting at 181° C.

22 parts of the above acylamino-compound are melted, while stirring, with 10.9 parts of 1-amino-2-hydroxybenzene and 0.4 part of boric acid for 4 hours under the reduced pressure of a water jet pump. During this period nitrogen is slowly introduced into the reaction vessel. The melt is then extracted at the boil with 100 parts of methyl alcohol, and the mixture is cooled and filtered. The filter residue is recrystallized from isopropyl alcohol. There is obtained the compound of the formula

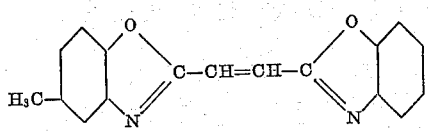

which melts at 173–175° C., and is soluble, for example, in ethyl alcohol and methylene chloride. When exposed to ultra-violet light it exhibits an intense blue fluorescence.

By using, instead of 10.9 parts of 1-amino-2-hydroxy-benzene, 16 parts of 1-amino-2-naphthol, there is obtained the compound of the formula

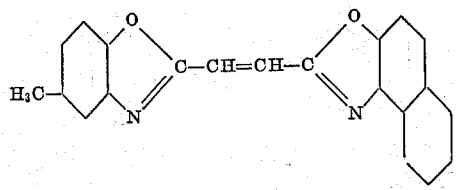

having similar properties.

Example 3

45 parts of acyl-compound of the formula

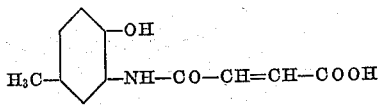

(prepared in the manner described in the first paragraph of Example 2) are added to a melt of 15 parts of water and 225 parts of zinc chloride at 160–170° C., and then the mixture is maintained at that temperature for 8 hours. Then 600 parts of cold water are added dropwise while allowing the temperature to fall. After the addition of hydrochloric acid to produce an acid reaction, the whole is stirred for about one hour at about 90° C., then allowed to cool, and the product so obtained is filtered off and washed with water. In order to remove by-products the filter residue is stirred with cold dilute sodium carbonate solution, filtered, the filter residue is acidified with dilute hydrochloric acid, and the precipitated product is filtered off and washed neutral with water. By recrystallization from aqueous alcohol the oxazole compound of the formula

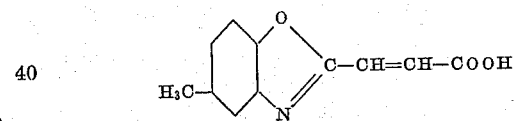

is obtained in the form of a bright beige powder melting at 190° C.

By using, instead of 45 parts of the acylamino compound of the above formula, an equivalent quantity of the acyl-compound of the formula

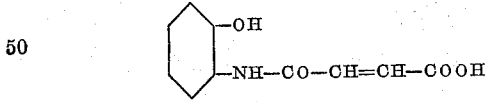

(prepared as described in the first paragraph of Example 1) there is obtained under otherwise similar conditions the product of the formula

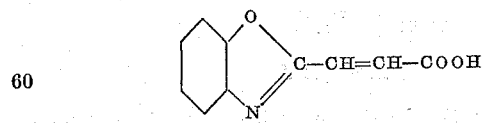

in the form of a bright powder melting at 215° C. 6 parts of the compound of the formula

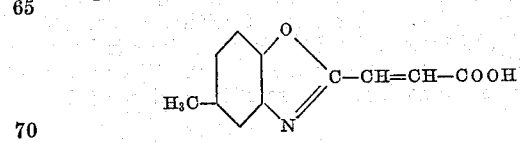

are melted in a current of nitrogen for 6 hours with 3.6 parts of 1-amino-2-hydroxy-5-methylbenzene and 0.1 part of boric acid at 180–185° C. The reaction product is then recrystallized twice from a mixture of methylene chloride and methyl alcohol. There is obtained the compound of the formula

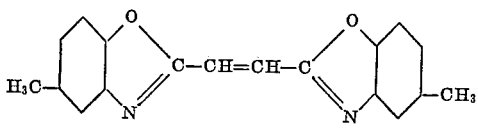

in the form of needle-shaped crystals which melt at 182–183° C.

*Example 4*

20.3 parts of the monocarboxylic acid of the formula

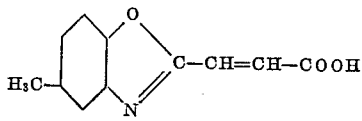

are heated up to 180° in the course of about 3 hours with 32.4 parts of 1:2-diaminobenzene and 0.2 part of boric acid with the exclusion of air, and the whole is then maintained at 180–190° C. until water no longer escapes. The whole is then allowed to cool and the excess of 1:2-diaminobenzene is removed by extraction with alcohol or benzene. This residue is dissolved in hot dilute hydrochloric acid, and the condensation product is precipitated from the solution by means of ammonia, then filtered off and washed neutral with water. It may be further purified by way of its hydrochloride. The compound so obtained has the formula

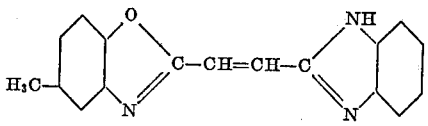

and is a bright powder, of which solutions in alcohol exhibit a bluish fluorescene in ultra-violet light.

By using in this example, instead of 20.3 parts of the monocarboxylic acid of the above formula, an equivalent quantity of the monocarboxylic acid of the formula

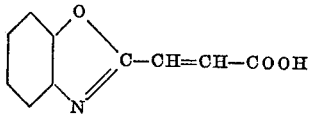

there is obtained a compound having the formula

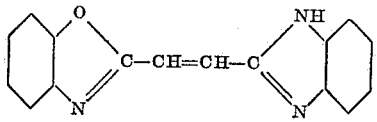

which has similar properties.

*Example 5*

55 parts of 1-amino-2-hydroxy-benzene, 49 parts of maleic anhydride and 1000 parts by volume of cymene are stirred for 30 minutes at 100° C. There are then added 1.5 parts of boric acid and the mixture is heated at the boil under reflux. After about 10 minutes a solution is obtained, and the solution is maintained for one hour at the boiling temperature of the solvent. The whole is then allowed to cool, and the reaction product of the formula

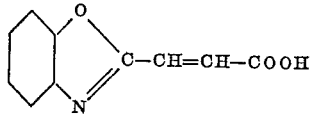

is obtained in the form of orange-yellow crystals melting at 208–210° C. For further purification it may be recrystallized from a mixture of methyl alcohol and water.

*Example 6*

6 parts of 1-amino-2-hydroxybenzene and 5.5 parts of maleic anhydride are stirred in 100 parts by volume of cymene at 30° C. for one hour. There are then added 6.8 parts of 1-amino-2-hydroxy-5-methylbenzene and 0.2 part of boric acid, and the mixture is first maintained for one hour at 130° C. and is then heated at the boil under reflux for 2 hours. The cymene is then removed with steam, and the residue is recrystallized from a mixture of methylene chloride and methyl alcohol. There is obtained the product of the formula

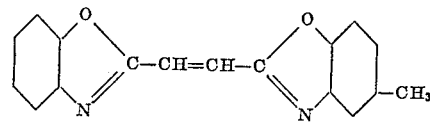

in the form of orange brownish needles melting at 172–173° C.

*Example 7*

12 parts of the compound of the formula

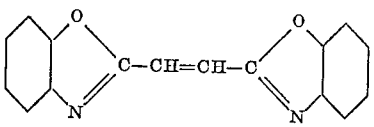

prepared as described in Example 2 are worked up into a finely dispersed paste with 12 parts of an addition product of about 30 molecular proportions of ethylene oxide with a mixture of saturated fatty alcohols mostly containing 18 carbon atoms and with 76 parts of water.

100 parts of a polyester fabric, for example, "Terylene" are treated for one hour at 60–90° C. in a bath of the following composition:

3000 parts of water,
6 parts of formic acid of 85% strength,
6 parts of sodium chlorite,
0.7 part of the preparation described above, and the material is rinsed and dried. The material so treated has a higher content of white than the material containing no addition of the oxazole compound.

What is claimed is:

1. The carboxylic acid of the formula

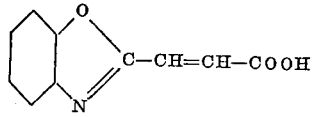

2. The carboxylic acid of the formula

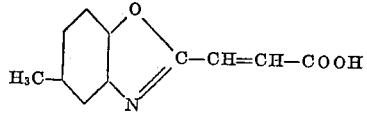

3. A carboxylic acid of the formula

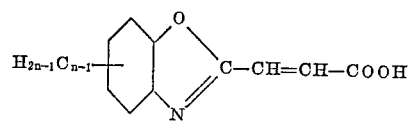

in which $n$ represents a whole number of at the most 2.

(References on following page)

References Cited in the file of this patent

UNITED STATES PATENTS

| | | |
|---|---|---|
| 2,483,392 | Meyer et al. | Oct. 4, 1949 |
| 2,488,094 | Graenacher et al. | Nov. 15, 1949 |
| 2,842,545 | Duennenberger et al. | July 8, 1958 |

FOREIGN PATENTS

| | | |
|---|---|---|
| 623,428 | Great Britain | May 17, 1949 |

OTHER REFERENCES

Hubner: Liebig's Ann., volume 210, pages 384–6 (1881).

Theilaeker: J. für prakt. Chem., volume 153, pages 54–6 (1939).

Elderfield: Heterocyclic Compounds, volume 5, pages 274–5, 420–1 (1957).